(12) United States Patent
Yamamoto

(10) Patent No.: US 7,584,826 B2
(45) Date of Patent: Sep. 8, 2009

(54) VEHICLE PARKING BRAKE DEVICE

(75) Inventor: Teruaki Yamamoto, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 365 days.

(21) Appl. No.: 11/484,802

(22) Filed: Jul. 11, 2006

(65) Prior Publication Data
US 2008/0011563 A1    Jan. 17, 2008

(51) Int. Cl.
    F16D 65/14    (2006.01)
    F16D 65/30    (2006.01)
    G05G 5/06    (2006.01)

(52) U.S. Cl. .................. 188/2 D; 188/265; 74/526; 74/532

(58) Field of Classification Search .............. 188/24.18, 188/2 D, 265; 74/502.2, 519, 523, 526, 532, 74/501.6; 192/99 R, 99 S, 129 R, 12 R, 13 R, 192/13 A
See application file for complete search history.

(56) References Cited

U.S. PATENT DOCUMENTS 3,688,599 A * 9/1972 St. Germain ................. 74/526
4,362,228 A * 12/1982 Plamper et al. ............... 74/526
4,570,593 A * 2/1986 Take et al. .................... 74/526
4,667,785 A * 5/1987 Toyoda et al. ................ 74/532
5,857,385 A * 1/1999 Takeuchi ................... 74/501.6
2008/0196539 A1* 8/2008 Schmauder ................. 74/519

FOREIGN PATENT DOCUMENTS

JP    60050039 A  *  3/1985
JP    2001-063675     3/2001
JP    2004-276649    10/2004

OTHER PUBLICATIONS

Translation of JP 2004-0276649 (Karube, Shinichi), Parking Lever Device of a Vehicle.*

* cited by examiner

Primary Examiner—Thomas J Williams

(57) ABSTRACT

A parking brake device for a vehicle includes a vehicle operating lever pivotally mounted on a bar-type steering handle having one end thereof provided with a grip that may be gripped by a driver, and a parking lever manually movable between an actuated position, at which a parking brake mechanism mounted on the vehicle is actuated, and a release position at which the parking brake mechanism is released. The parking lever referred to above is, when moved to the actuated position, positioned in between the grip of the steering handle and the operating lever to thereby hamper the operating lever from being pivoted in an operating direction.

12 Claims, 7 Drawing Sheets

INNER ← → OUTER

VEHICLE PARKING BRAKE DEVICE

BACKGROUND OF THE INVENTION

1. Field of the Invention

The present invention relates to a vehicle parking brake device operable to brake a vehicle wheel when a parking lever operatively mounted on a bar-type steering handle for angular movement between release and actuated positions is pivoted to the actuated position at the time the vehicle is desired to be parked.

2. Description of the Prior Art

It is well known that off-road vehicles such as buggies and some motor scooters, for example, are provided with not only a standard brake device for braking a vehicle wheel during normal run of the vehicle, but also a parking brake device that is used to lock the vehicle wheel during the parking of the vehicle. The Japanese Laid-open Patent Publication No. 2001-63675, published Mar. 13, 2001, discloses a first prior art parking brake device of this kind, which includes a parking lever mounted on a grip of the steering handle for pivotal movement between release and actuated positions about a pivot axis lying vertically. The parking lever employed in this known parking brake device is, when pivotally moved to the actuated position to lock the vehicle wheel, positioned at a rearwardly lower location of the grip of the handle and on one side of the grip opposite to the brake lever that is positioned forwardly of the grip with respect to the direction of forward run of the vehicle.

According to this known parking brake device, the parking lever is so arranged and so positioned that when a rider trying to start the vehicle extends his or her hand to the grip of the steering handle, his or her hand can compulsively touch the parking lever that is positioned at the rearwardly lower location of the handle grip, thus calling an attention to the rider that the parking lever is then held in the actuated position. Once the rider is so called to the attention, the rider can recognize himself or herself that he or she must move the parking lever to the release position.

The Japanese Laid-open Patent Publication No. 2004-276649, published Oct. 7, 2004, discloses a second prior art parking brake device including a parking lever pivotally disposed at a position adjacent a clutch lever that is pivotally mounted forwardly on a grip of the steering handle. In this second prior art parking brake device, a release input portion of the parking brake is so positioned as to confront a surface portion of a free end of the clutch lever with respect to the direction, in which the clutch lever is pulled in, when the parking lever is held at the actuated position. The parking lever can be pivoted towards the release position when the release input portion, which is represented by a slant surface, is pressed in contact with the surface portion of the free end of the clutch lever, thus allowing the parking brake device to be automatically released.

However, the first prior parking brake device has been found having the following problem. Specifically, it is quite often that when the rider trying to start the vehicle has his or her hand place on the grip of the steering handle touches the parking lever, the rider may not so much feel a sense of incompatibility with the way he or she does regularly on the same occasion, and, accordingly, the rider may start the vehicle forcibly without noticing that the parking brake device is actuated. Once this occurs, not only may the life time of the parking brake device be reduced, but the engine will be excessively loaded. In particular, when the rider is hasty or wears thick gloves, the rider does, with high possibility, fail to recognize that the parking lever is held at the actuated position. This is also true even where the vehicle is of a type equipped with an automatic clutch and is therefore equipped with only the brake lever and without the clutch lever, because in this type of vehicle the grip of the steering handle is not required to be strongly gripped at the time of start of the vehicle.

On the other hand, the second prior art parking brake device has such a problem that the parking brake device may be unintentionally released when the rider touches the clutch lever unconsciously while the parking lever has been set to the actuated position during the parking. Also, this type of parking brake device is easily released by misbehavior to the parked vehicles.

SUMMARY OF THE INVENTION

In view of the foregoing, the present invention has been devised to substantially eliminate the problems and inconveniences encountered with the prior art parking brake devices and has for its primary object to provide an improved parking brake device for vehicles, in which unless the parking lever is consciously manipulated, the parking brake device cannot be released and in which so long as the parking lever is set to the actuated position, any other operating lever such as, for example, the clutch lever will not be operated.

In order to accomplish the foregoing and other objects of the present invention, there is, in accordance with the present invention, provided a parking brake device for a vehicle, which includes a vehicle operating lever pivotally mounted on a bar-type steering handle having one end thereof provided with a grip to be gripped by a driver, and a parking lever manually movable between an actuated position, at which a parking brake mechanism mounted on the vehicle is actuated, and a release position at which the parking brake mechanism is released. The parking lever referred to above is, when moved to the actuated position, positioned in between the grip of the steering handle and the operating lever to hamper the operating lever from being pivoted in an operating direction.

According to this structural feature, during the condition in which the parking lever is held in the actuated position, the vehicle operating lever such as, for example, a clutch lever is physically barred from being pivoted towards an operated position, failing to reach the operated position even when an attempt is made to angularly move the vehicle operating lever towards the operated position. Accordingly, since the rider can readily recognize that the parking lever has been set to the actuated position and can therefore be invited to move the vehicle operating lever after the parking lever is moved to the release position, the possibility can be avoided, which the vehicle may be started while the parking brake is set in the actuated position.

Also, since there is no possibility that during the parking the parking lever may be automatically moved towards the release position in response to manipulation of the vehicle operating lever after the rider has moved the parking lever to the actuated position, there is no possibility that the parking brake device is released, unless the rider trying to start the vehicle manipulates the parking lever to move to the release position. Because of this, after the parking lever has been set to the actuated position, the parking brake device is kept actuated even though the rider unconsciously touches the clutch lever or someone other than the rider manipulates the clutch lever of the vehicle then parked, resulting in increase of the reliability of the parking brake device.

For example, the parking lever referred to above is adapted to be pivoted approximately 180° about an axis of pivot thereof from the actuated position towards the release position that is defined forwardly of a handlebar to thereby enable the vehicle operating lever to pivot in the operating direction. Also, the vehicle operating lever referred to above is a clutch lever used to selectively couple and decouple a clutch of the vehicle.

In a preferred embodiment of the present invention, an operating lever holder for pivotally supporting the vehicle operating lever and a clamp cooperable with the operating lever holder may be provided such that the operating lever holder can be fixedly mounted on the steering handle through the clamp, and, on the other hand, the parking lever is pivotally mounted on a parking lever holder provided in the clamp.

According to this structural feature, since the operating lever holder and the parking lever holder are both mounted on the steering handle through the clamp, which is a member separate from both of them, a clamp of a kind having no support for the parking lever holder can be utilized to a vehicle such as, for example, a motorcycle having no parking brake device employed and, therefore, preparation of two types of clamp, which are small products, will be sufficient for use in the vehicle having the parking brake device and the vehicle having no parking brake device.

In another preferred embodiment of the present invention, a cable may be utilized for operatively connecting the parking lever and the parking brake mechanism with each other. In this case, this cable has one end provided with an anchoring piece secured thereto, and the parking lever has a base end pivotably supported in between first and second lever support members provided in the parking lever holder. The anchoring piece referred to above is then arranged at a location away from the base end of the parking lever along an axis of pivot of the parking lever.

According to this structural feature, the parking lever can be solidly supported by the first and second lever support members. Also, since the anchoring piece is positioned having been displaced in one direction from the base end of the parking lever, the anchoring piece can readily and easily be engaged to the parking lever.

In a further preferred embodiment of the present invention, the first lever support member may be positioned on one side of the second lever support member remote from the anchoring piece and may have an internally threaded hole defined therein, at the same time, the second lever support member may have an insertion hole defined therein in alignment with the internally threaded hole in the first lever support member and the base end of the parking lever may have a throughhole defined therein. In this case, a support bolt for pivotally supporting the parking lever may be threaded into the internally threaded hole in the first lever support member and then through the throughhole in the base end of the parking lever and finally inserted through the insertion hole in the second lever support member, to thereby pivotally support the parking lever.

According to this structural feature, since of the first and second lever support members used to pivotally support the base end of the parking lever, the second lever support member close to the anchoring piece is merely provided with the insertion hole defined therein, the thickness of the second lever support member can be reduced. Accordingly, since the anchoring piece at one end of the cable can be brought to a position close to the base end of the parking lever, which includes the axis of pivot of the parking lever, the parking lever can have an ample strength in a quantity corresponding to the amount of reduction of the moment induced by the tensile force of the cable and acting on the parking lever, resulting in compactization and weight reduction of the parking lever.

In the practice of the present invention, a free end of the parking lever remote from an axis of pivot of the parking lever may have an abutment face defined therein, which surface-contacts a portion of the vehicle operating lever, confronting the abutment face, at the actuated position when the vehicle operating lever is pivoted. According to this structural feature, in the event that the vehicle operating lever is manipulated to move in the operating direction while the parking lever is still held at the actuated position, a pivoting force of the vehicle operating lever can be brought in surface contact (not point contact nor line contact) with and, hence, be received by the abutment face in the free end of the parking lever and, therefore, the contact pressure between the parking lever and the vehicle operating lever can be minimized.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Hereinafter, preferred embodiments of the present invention will be described in detail with reference to the accompanying drawings. Before the description proceeds, it is to be noted that the terms "left" and "right" used to speak of the direction of view are a relative term descriptive of the position or direction as viewed by a vehicle rider riding a vehicle, which vehicle is shown as represented by, for example, an off-the-road vehicle, and specifically a four-wheeled buggy, throughout the accompanying drawings.

Figure 1:
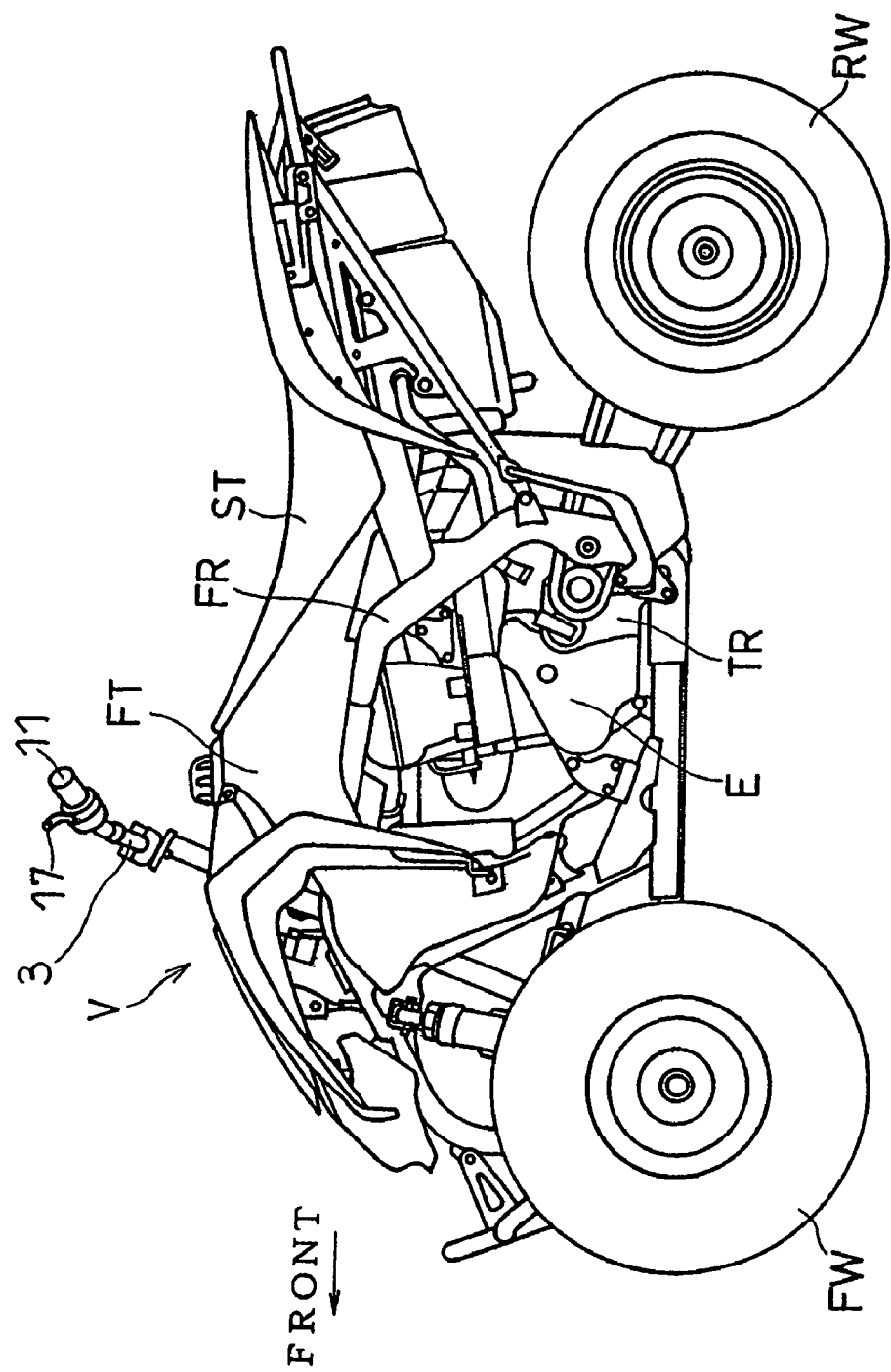
FIG. 1 is a side view showing a motorcycle, in its entirety, equipped with a parking brake device according to a preferred embodiment of the present invention.

Referring now to FIG. 1, the buggy V shown therein is equipped with a parking brake device according to a first preferred embodiment of the present invention and includes an engine, for example, an internal combustion engine E, mounted on a generally intermediate portion of the buggy frame structure FR. The buggy frame structure FR has left and right front wheels FW rotatably mounted on a front portion thereof and left and right rear wheels RW rotatably mounted on a rear portion thereof and adapted to be driven by the engine E. The illustrated buggy V also includes a drive transmission TR positioned generally rearwardly of the engine E and having a clutch (not shown) built therein for selectively coupling and decoupling the drive transmission from the engine E to the rear wheels RW. The front portion of the buggy frame structure FR is provided with a bar-type steering handle 3 for steering the front wheel FW. The buggy frame structure FR includes a fuel tank FT fixedly mounted on an upper portion thereof and a rider's seat ST mounted also on the upper portion thereof, but positioned generally rearwardly of the rider's seat ST.

Figure 2:
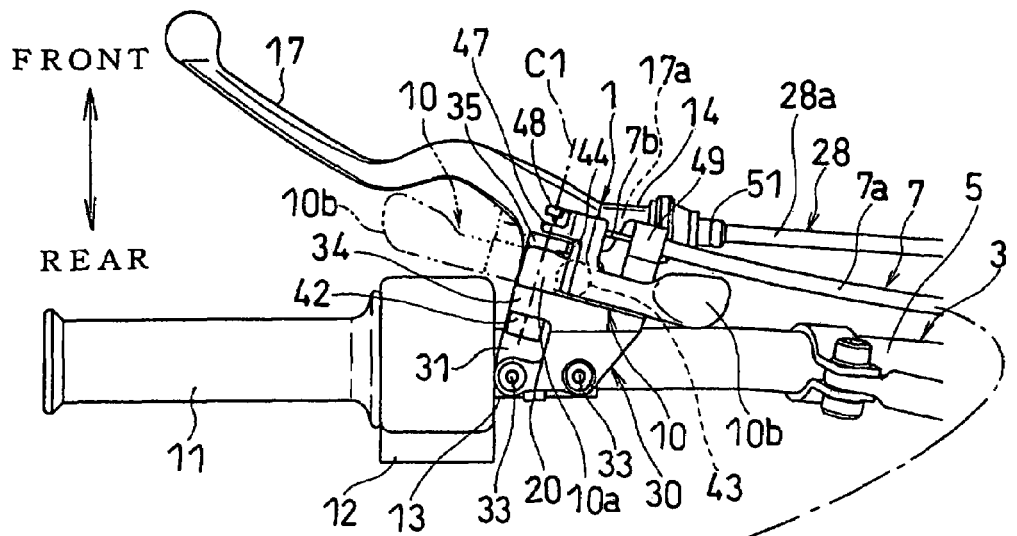
FIG. 2 is a fragmentary plan view of a portion of the motorcycle shown in FIG. 1, showing a brake operating unit in the parking brake device.
Figure 2:
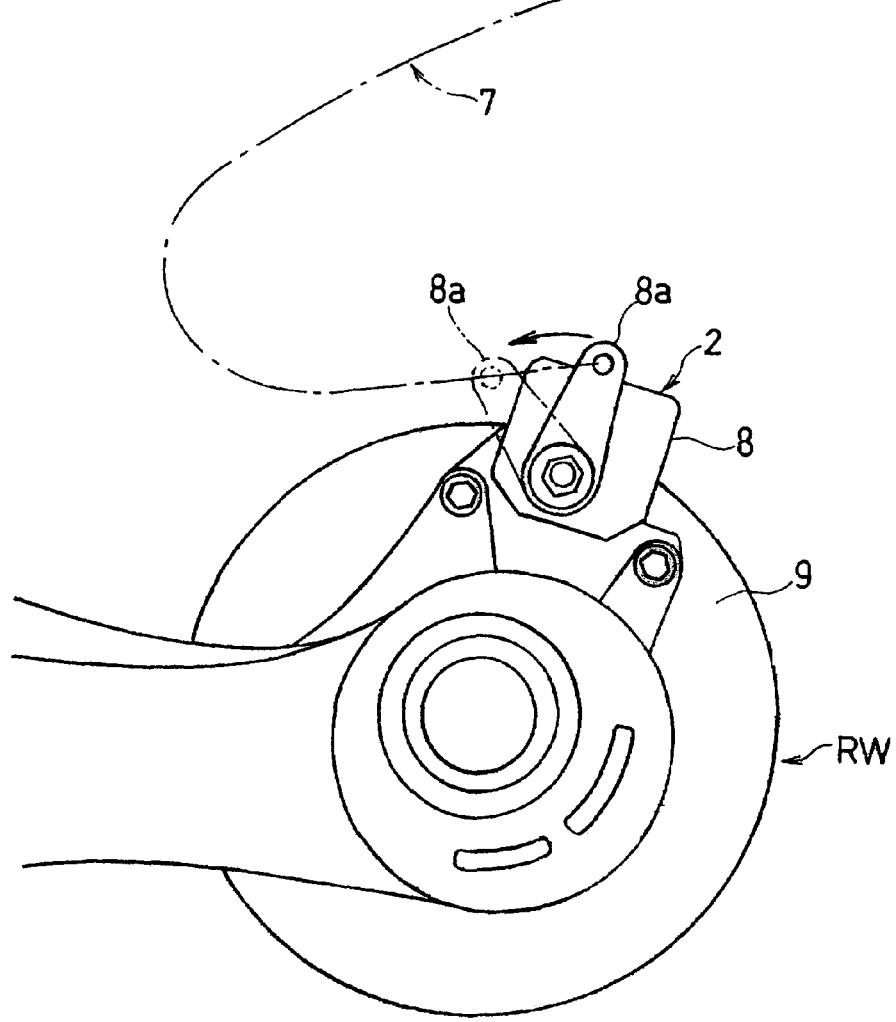

The parking brake device provided in this buggy V is so constructed and so operable in the following manner. As best shown in FIG. 2, the parking brake device broadly includes a parking brake operating unit 1 including a parking lever 10 operatively mounted on the bar-type steering handle 3, and a parking brake mechanism 2 positioned in a region of the buggy frame structure FR adjacent the rear wheels RW and drivingly coupled with the parking lever 10 through a cable 7. The parking brake mechanism 2 includes a brake caliper 8 having a brake actuating member 8a operatively coupled with the parking lever 10 through the cable 7 and movable between a released position, shown by the solid line, and an engaged position shown by the phantom line.

In this parking brake device, when the parking lever 10 pivotable between a release position, shown by the solid line, and an actuated position shown by the phantom line, is pivoted to the actuated position at the time of parking of the buggy V, the brake actuating member 8a is pulled by the cable 7 to move angularly from the released position towards the engaged position, causing a piston (not shown), incorporated in the brake caliper 8 in a know manner, to be thrust down to thereby apply a braking force to a brake disc 9. In this way, the parking brake device is held in the actuated position.

Figure 3:
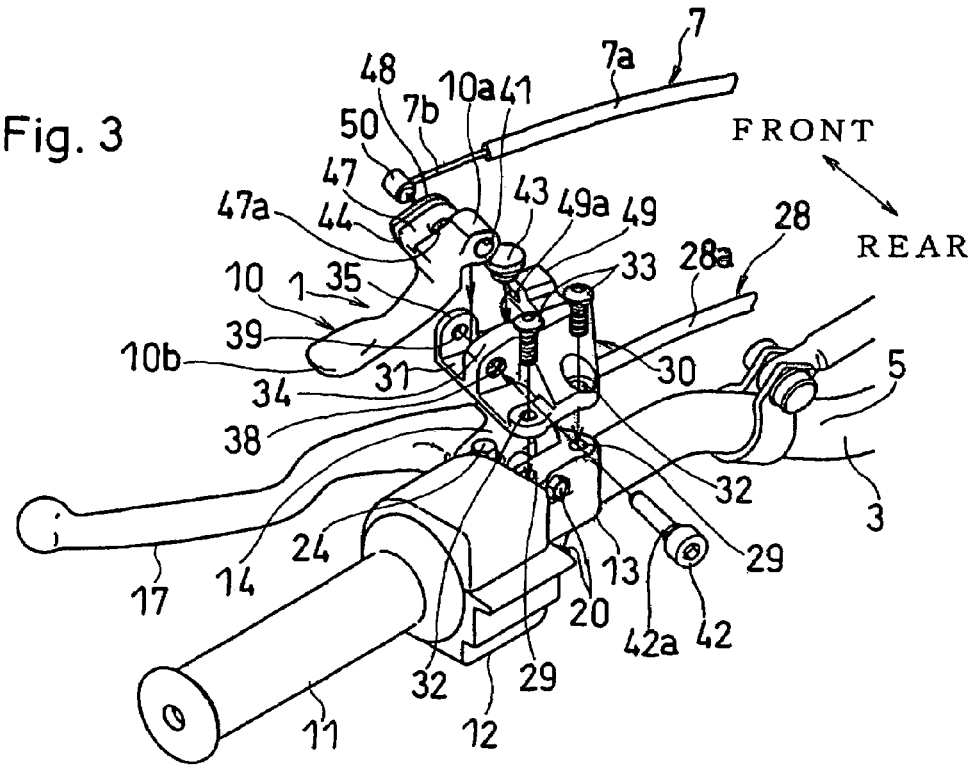
FIG. 3 is an exploded view of the brake operating unit shown in FIG. 2.

The brake operating unit 1 as viewed slantwise from top is shown in an exploded view in FIG. 3. Referring to this figure, the bar-type steering handle 3 includes a handlebar 5 extending in a direction widthwards of the buggy V and a grip 11 fixed on one end of the handlebar 5. The grip 11 shown in FIG. 3 is adapted to be gripped with a rider's left hand, and a switch casing 12 is mounted on a portion of the handlebar 5 adjacent to and inwardly of the grip 11 with respect to the widthward direction of the buggy V. The switch casing 12 accommodates therein various switches including, for example, a directional signal switch, a headlight High-Low changeover switch and others. The handlebar 5 of the bar-type steering handle 3 also has a clutch lever holder 14 fixedly mounted thereon by means of a clamp 13 at a location on one side of the switch casing 12 remote from the grip 11. This clutch lever holder 14 includes a clutch lever 17 which is pivotally mounted thereon for operating the clutch and which is an example of a buggy operating lever.

Figure 5:
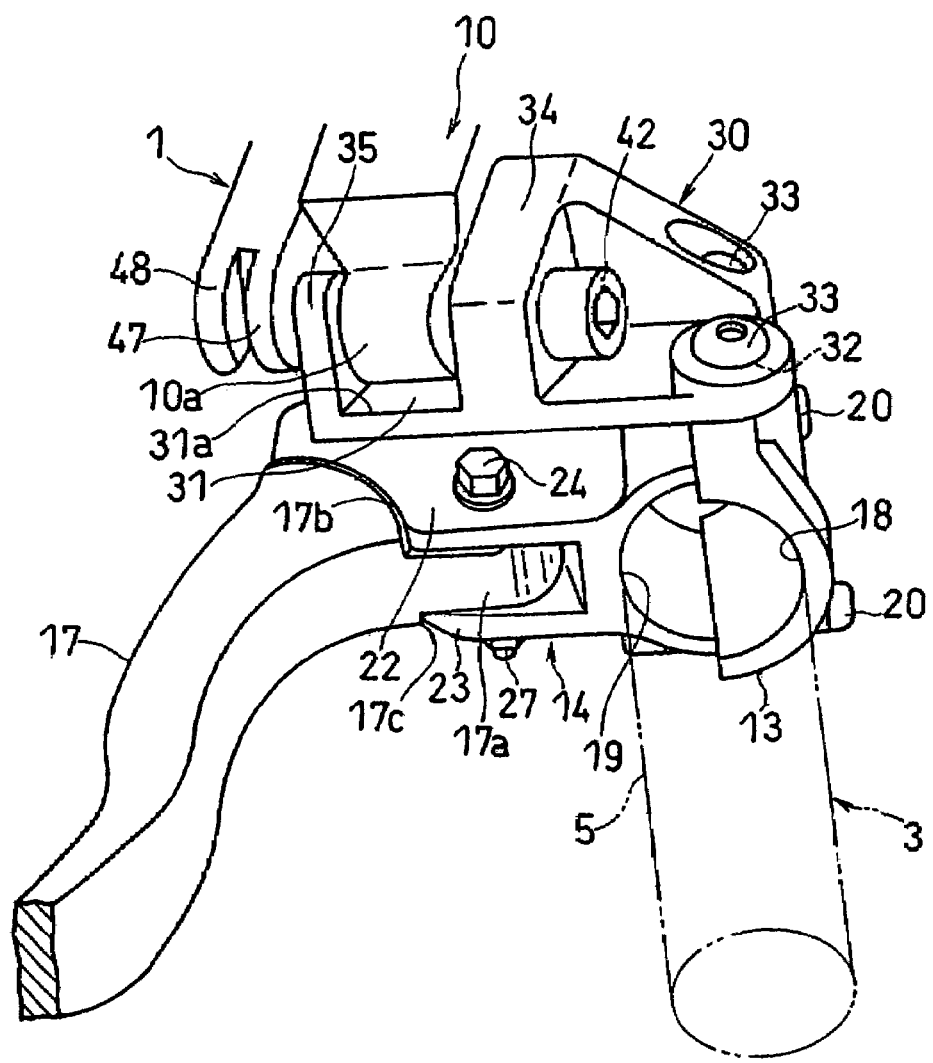
FIG. 5 is a perspective view of a portion of the brake operating unit as viewed from leftward of FIG. 4.

The manner in which the clutch lever 17 is operatively mounted on the handle 3 through the clutch lever holder 14 by way of the clamp 13 will be described in detail with particular reference to FIG. 5. Referring to FIG. 5, the clamp 13 and the clutch lever holder 14 are formed with respective holding grooves 18 and 19 of a substantially semicircular sectional shape following the curvature of a cross-sectional area of the handlebar 5 of the bar-type handle 3. The clutch lever holder 14 is mounted on the handlebar 5 with the holding groove 19 receiving therein one of longitudinal halves of the handlebar 5 and is fixed in position on the handlebar 5 when the clamp 13 is mounted on the handlebar 5 with the holding groove 18 receiving therein the other of the longitudinal halves of the handlebar 5 and two bolts 20 spaced apart from each other in a vertical direction with respect to the handlebar 5 are subsequently inserted through respective insertion holes (not shown), defined in the clamp 13 so as to lie perpendicular to the holding groove, and firmly threaded into internally threaded holes (not shown) defined in the clutch lever holder 14. With the clutch lever holder 14 fixed in position on the handlebar 5 in this way, the clutch lever holder 14 and the clamp 13 cooperate with each other to clamp the handlebar 5 firmly therebetween.

The clutch lever holder 14 is provided with upper and lower plate-like support members 22 and 23 that extend substantially horizontally, and the clutch lever 17 has a base end 17a positioned between those upper and lower support members 22 and 23 and pivotally supported thereby through a mounting bolt (pivot pin) 24. In other words, with the mounting bolt 24 inserted through respective mounting holes (not shown), defined in the upper and lower support members 22 and 23, by way of a mounting hole (pivot hole) (not shown) defined in the base end 17a of the clutch lever 17, the clutch lever 17 is supported by the clutch lever holder 14 for pivotal movement in a substantially horizontal direction about the support bolt 24. As a matter of course, the support bolt 24 has a nut 27 that is threaded, and is therefore fixed, to a free end thereof. Unless the clutch lever 17 so pivotally supported is manipulated, upper and lower steps 17b and 17c formed integrally with the base end 17a of the clutch lever 17 are held in abutment with respective protruding end faces of the support members 22 and 23, with the pivotal movement of the clutch lever consequently controlled. In this condition, the clutch lever 17 is held in a clutch coupling position, in which the clutch built is in position to couple the drive transmission TR with the engine E.

Referring again to FIG. 3, the clutch lever 17 so pivotally supported by the clutch lever holder 14 in the manner described above, is operatively coupled through a clutch cable 28 with a clutch device (not shown) for transmitting a driving power, produced by the engine E, to the transmission TR of the buggy V. When the rider holding the grip 11 pulls the clutch lever 17 in a direction close towards the grip 11, the clutch device is set to a decoupling position through the clutch cable 28.

The parking brake operating unit 1 of the parking brake device referred to above is movably mounted atop the clamp 13 used to secure the clutch lever holder 14 to the handlebar 5 as hereinabove described. More specifically, two threaded holes 29 used to fix a parking lever holder 30 of the parking brake operating unit 1 are defined in an upper surface of the clamp 13 and, on the other hand, the parking lever holder 30 has a base plate 31 formed with two mounting holes 32 and 32 defined therein in cooperative relation with the threaded holes 29 defined in the clamp 13. Accordingly, when the parking lever holder 30 is placed on the upper surface of the clamp 13 after it has been positioned relative to the clamp 13 with the mounting holes 32 aligned respectively with the threaded holes 29, two fixing bolts 33, 33 are, after having been passed through the associated mounting holes 32, threaded firmly into the corresponding threaded holes 29 to thereby fix the clamp 13 to the parking lever holder 30.

The base plate 31 of the parking lever holder 30 is formed with a pair of lever support walls 34 and 35 protruding upwardly therefrom and spaced a distance from each other in a direction conforming to the longitudinal sense (front-and-rear direction) of the buggy V. The lever support walls 34 and 35 are used to pivotally support the parking lever 10 and, for this purpose, one of the lever support walls, the lever support wall 35, positioned on one side of the other support wall 34 remote from the fixing bolts 33 is formed with a horizontally extending insertion hole 39 and the other lever support wall 34 is formed with a horizontally extending internally threaded hole 38 in alignment with the insertion hole 39 in the lever support wall 35. With a base end 10a of the parking lever 10 positioned in between the support walls 34 and 35, the parking lever 10 is supported by the support walls 34 and 35 by means of a support bolt (pivot pin) 42 for pivotal movement up and down in a generally vertical plane. In other words, while an insertion hole 41 defined in the base end 10a of the parking lever 10 is aligned with the insertion hole 39 in the support wall 35 and the internally threaded hole 38 in the support wall 34, the support bolt 42 having an externally threaded portion 42a defined in the vicinity of a bolt head thereof is passed through the internally threaded hole 38 in the support wall 34, then through the insertion hole 41 in the parking lever 10 and finally through the insertion hole 39 in the support wall 35, with the externally threaded portion 42a firmly fastened in the internally threaded hole 38 in the support wall 34. In this way, the parking lever 10 is pivotally supported by the support bolt 42 with the base end 10a thereof positioned in between the support walls 34 and 35.

The parking lever 10 mounted on the handlebar 5 in the manner described above is movable between the release and actuated positions about the substantially horizontally laid support bolt 42 in a plane substantially perpendicular to the clutch lever 17, which is movable in the substantially horizontal plane about the mounting bolt 24, so as to depict a generally semicircular trace of angular movement of approximately 180° about the support bolt 42. In order to prevent the parking lever 10, then held at the release position as shown by the solid line in FIG. 2, from undergoing a vibration during the travel of the buggy V, a rubber damper 43 is fixed in position inserted in a mounting hole (not shown) defined in the base plate 31 of the parking lever holder 30 at a location adjacent the base end 10a of the parking lever 10.

The cable 7 best shown in FIG. 2 has one end coupled with the parking lever 10 in the following manner. Specifically, the parking lever 10 has a pair of parallel cable engagement projections 47 and 48 formed therewith through an extension 44 protruding forwards from the base end 10a thereof, which projections 47 and 48 are spaced a predetermined distance from each other. On the other hand, the parking lever holder 30 has a front right portion (front inside portion) formed with a cable support 49 having a cable receiving groove 49a defined therein as best shown in FIG. 3.

Accordingly, while one end of a cable sheath (cable outer) 7a is firmly retained by the cable support 49, a cable wire (cable inner) 7b, that extends movably inside the cable sheath 7a, and is drawn outwardly from the one end of the cable sheath 7a through a cable receiving groove 49a, has a cylindrical anchor piece 50 rigidly secured thereto and is connected with the parking lever 10 with the cylindrical anchor piece 50 engaged in the cable engagement projections 47 and 48 so as to extend therebetween. In this way, the cable 7 is operatively connected with the parking lever 10.

Figure 6:
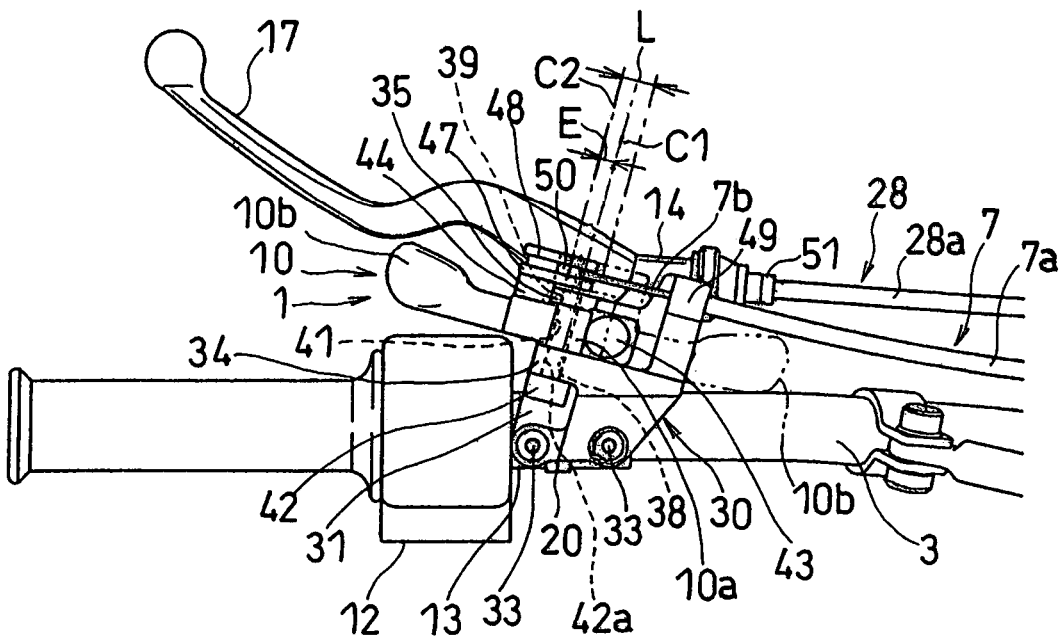
FIG. 6 is a plan view of the brake operating unit, showing a parking brake held in an actuated position.
Figure 8:
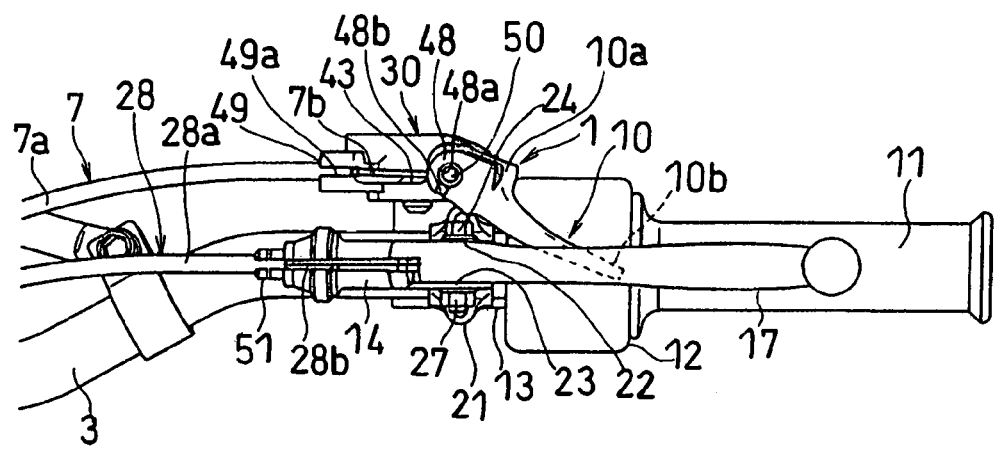
FIG. 8 is a rear view of the brake operating unit of FIG. 6, as viewed from a front side of the motorcycle, showing the parking brake held in the actuated position.

To describe the connection of the cable 7 with the parking lever 10 in more detail, the inside (rear side) cable engagement projection 47, which is positioned on one side close towards the rider's position, is formed with a retaining hole 47a for receiving therein one end of the cylindrical anchor piece 50. Also, as shown in FIG. 8, which shows the brake operating unit 1, as viewed from front, with the parking lever 10 set in the actuated position, the remaining outside (front side) cable engagement projection 48 is formed with a retaining hole 48a in alignment with the retaining hole 48a for receiving therein the opposite end of the cylindrical anchor piece 50 and also with a cable inserting groove 48b extending inwardly from an outer periphery of the cable support 49 and communicated with the retaining hole 48a. While one end of the cable sheath 7a is retained by the cable support 49 with the cable wire 7b inserted into the cable support 49 through the cable receiving groove 49a, that end of the cable 7 can be connected with the parking lever 10 when the cable wire 7b is inserted in between the cable support projections 47 and 48, as shown in FIG. 6, through the cable inserting groove 48b.

The support bolt 42 of the parking lever 10 defines a pivot axis C1 about which the parking lever 10 undergoes the angular movement between the release and actuated positions. The cylindrical anchoring piece 50 secured to the one end of the cable 7 and connected with the parking lever 10 in the manner described above is arranged having been displaced towards one side (forwards in the illustrated embodiment) along this pivot axis C1 of the parking lever 10. Specifically, an axis of support C2 of the cylindrical anchoring piece 50 lies at a position displaced a predetermined quantity E from the pivot axis C1 of the parking lever 10 towards the left side or the actuated position. Accordingly, when the parking lever 10 is moved angularly from the release position, shown by the phantom line, to the actuated position shown by the solid line, the anchoring piece 50 can be displaced a predetermined distance L, which is about twice the predetermined quantity E, to allow the cable wire 7b to be drawn outwardly from the cable sheath 7a.

Also, the clutch cable 28 referred to previously is connected with the clutch lever 17 in a manner substantially similar to the connection of the cable 7 with the parking lever 10. Specifically, as best shown in FIG. 8, a cable sheath (cable outer) 28a of the clutch cable 28 is inserted into and is then retained by a cable engagement 51, defined in the clutch lever holder 14, and a free end of a cable wire (cable inner) 28b drawn outwardly from the cable sheath 28a is connected with the clutch lever 17.

Hereinafter, the operation of the parking brake device according to the present invention will be described.

Referring now to FIG. 6, when the rider halting the buggy V is going to leave from the buggy V, for example, the rider manipulates to move the parking lever 10 from the release position, shown by the phantom line, towards the actuated position shown by the solid line. At this time, the anchoring piece 50 secured to that end of the cable 7 moves the predetermined distance L and, therefore, the cable wire (inner cable) 7b of the cable 7 is drawn outwardly from the cable sheath (cable outer) 7a a distance corresponding to the predetermined distance L. Since the cable wire 7b pulls the brake actuating member 8a of the brake caliper 8 of the parking brake mechanism 2 best shown in FIG. 2 from the released position, shown by the solid line, towards the engaged position shown by the phantom line, the piston of the brake caliper 8 is mechanically thrust down to thereby apply a braking force to the brake disc 9. In this way, the parking brake device is held in the actuated position.

Figure 4:
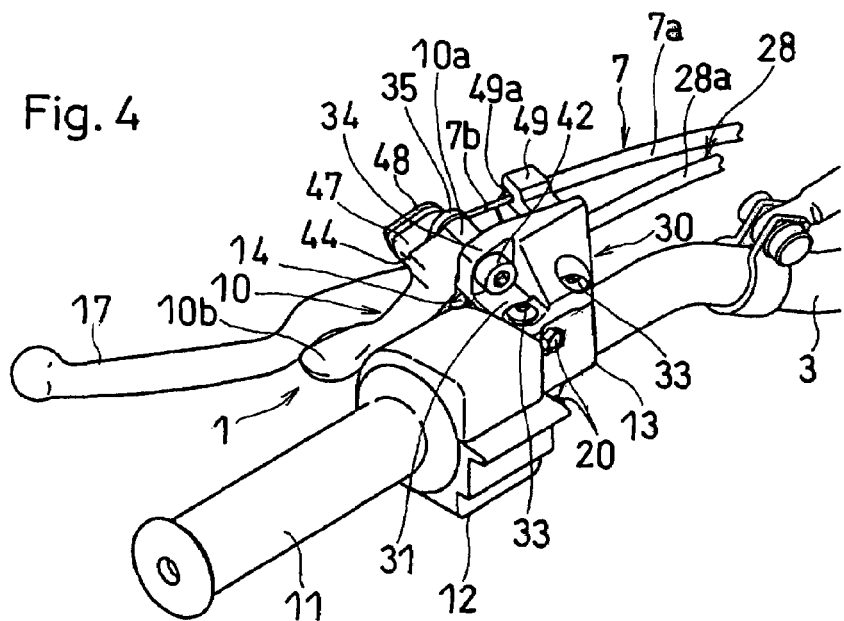
FIG. 4 is a perspective view of the brake operating unit shown in FIG. 2.
Figure 7:
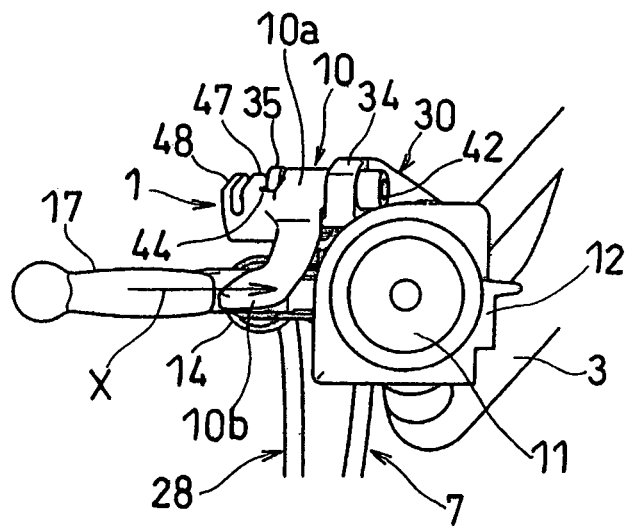
FIG. 7 is a perspective view of the brake operating unit as viewed from leftwards of FIG. 6, showing the parking brake held in the actuated position.

Considering that the parking lever 10 moves angularly upwardly in the substantially vertical plane about the pivot axis C1, represented by the support bolt 42, arranged substantially horizontally, so as to depict a generally semicircular trace of angular movement, a free end of the parking lever 10, which defines an operating area 10b thereof, moves from above towards the actuated position that is defined between the grip 11 of the steering handle 3 and the clutch lever 17, which are held at the substantially same heightwise position, as shown in FIG. 4. Accordingly, as shown in FIG. 7, the operating area 10b of the parking lever 10 is brought into abutment with the clutch lever 17, which is pivoted in an operating direction, shown by the arrow X, in a horizontal plane when pulled close towards the grip 11, to thereby inhibit the clutch lever 17 from being further pivoted. Also, the parking lever 10 is biased by a return spring force from the parking brake mechanism (shown in FIG. 2) through the cable wire 7b of the cable 7 so as to move in a brake releasing direction. However, since, at the actuated position of the parking lever 10, the connecting portion between the cable wire 7b and the parking lever 10, is set at a position past the top dead center or the neutral position at which a working torque brought about by the return spring force turns zero, a portion of the parking lever 10 adjacent the base end 10a thereof is urged by this return spring force towards an outer corner 31a of the base plate 31 of the parking lever holder 30 as shown in FIG. 5, with the parking lever 10 stably held at the actuated position consequently.

In view of the foregoing, once the parking lever 10 has been set to the actuated position shown by the phantom line in FIG. 2, even though the rider does, without recognizing that the parking brake lever has been set to the actuated position, try to pull the clutch lever 17 towards a clutch decoupling position at the time of start of the buggy V, the clutch lever 17 is barred in abutment with the operating area 10b of the parking lever 10, then held at the actuated position, from being pivoted, failing to reach an actuated position of the clutch lever 17. In this way, abutment of the clutch lever 17 with the operating area 10b of the parking lever 10 prompts the rider to the parking lever 10 having been held in the actuated position. Accordingly, the rider can be invited to pull the clutch lever 17 close towards the grip 11 after the rider moves the parking lever 10 angularly towards the release position. Thus, so long as the parking lever 10 is held at the actuated position, it is possible to prevent the buggy V from being started while the parking brake device has been actuated.

On the other hand, when at the time of parking the rider manipulates the parking lever 10 to move to the actuated position, there is no possibility that the parking lever 10 may be automatically pivoted towards the release position in response to manipulation of the clutch lever 17. Because of this, after the parking lever 10 has been set to the actuated position, the parking brake device is kept actuated even though the rider unconsciously touch the clutch lever 17 or someone other than the rider manipulates the clutch lever 17 of the buggy V then parked, resulting in increase of the reliability of the parking brake device.

Figure 9:
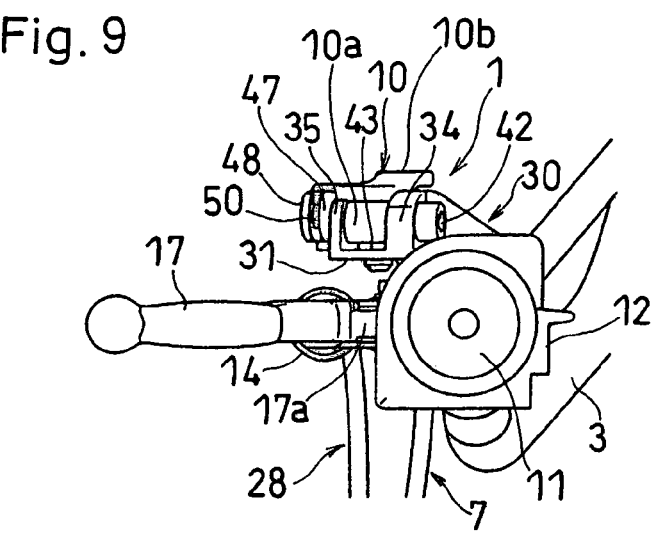
FIG. 9 is a view similar to FIG. 7, showing the parking brake held in a release position.
Figure 10:
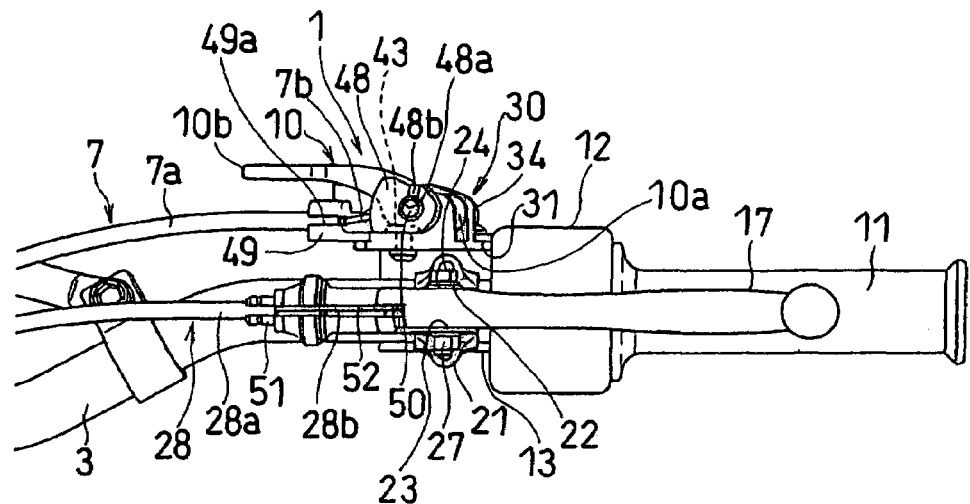
FIG. 10 is a view similar to FIG. 8, showing the parking brake held in the release position.

When in readiness for the start of the buggy V, the rider manipulates the parking lever 10 to move from the actuated position to the release position shown by the solid line, the operating area 10b of the parking lever 10 moves out of the space between the clutch lever 17 and the grip 11 as shown in FIG. 9 and assumes a position displaced inwardly of the vehicle frame structure FR relative to the clutch lever 17 as shown in FIG. 10. Accordingly, during the subsequent run of the buggy V, the parking lever 10 will no longer hamper the movement of the clutch lever 17.

In this condition, by the effect of the return spring force of the parking brake mechanism 2, the portion adjacent the base end 10a of the parking lever 10 is brought into engagement with an upper surface of the rubber damper 43. Accordingly, transmission of engine vibrations to the parking lever 10 through the steering handle 3 can be suppressed to thereby prevent the parking lever 10 from generating obnoxious vibration-induced sounds.

In the parking brake device of the structure described hereinbefore, the clutch lever holder 14 for pivotally supporting the clutch lever 17 is mounted on the handlebar 5 of the bar-type steering handle 3 by means of the clamp 13 as clearly shown in FIG. 5 and the parking lever holder 30 for pivotally supporting the parking lever 10 is fitted to the clamp 13. Since the clutch lever holder 14 and the parking lever holder 30 are mounted on the handlebar 5 of the steering handle 3 through the clamp 13, which is a member separate from those holders 14 and 30, in the manner described above, a clamp of a kind having no support for the parking lever holder 30 can be utilized to a vehicle such as, for example, a motorcycle having no parking brake device employed. Therefore, preparation of two types of clamp, which are a small product, will be sufficient for use in the vehicle having the parking brake device and the vehicle having no parking brake device.

In the illustrated embodiment is concerned, the parking lever 10 can be solidly supported by the pair of the lever support walls 34 and 35 provided in the parking lever holder 30. Also, since the position of the anchoring piece 50 is displaced in a direction away from the base end 10a of the parking lever 10 along the pivot axis C1 thereof (FIG. 6), engagement of the anchoring piece 50 to the parking lever 10 can be accomplished easily.

Of the lever support walls 34 and 35 that support the base end 10a of the parking lever 10, the lever support wall 35 positioned at a location close to the anchoring piece 50 of the cable 7 has no internally threaded element and is merely provided with the insertion hole 39 for the passage therethrough of the support bolt 42 and, therefore, the thickness of the support wall 35 can be reduced. Because of this, the anchoring piece 50 of the cable 7 can be, as shown in FIG. 6, brought to a position close to the base end 10a that defines the axis of pivot of the parking lever 10 in cooperation with the support bolt 42. Accordingly, the parking lever 10 can have an ample strength in a quantity corresponding to the amount of reduction of the moment induced by the tensile force of the cable 7 and acting on the parking lever 10, resulting in compactization and weight reduction of the parking lever 10.

Figure 11:
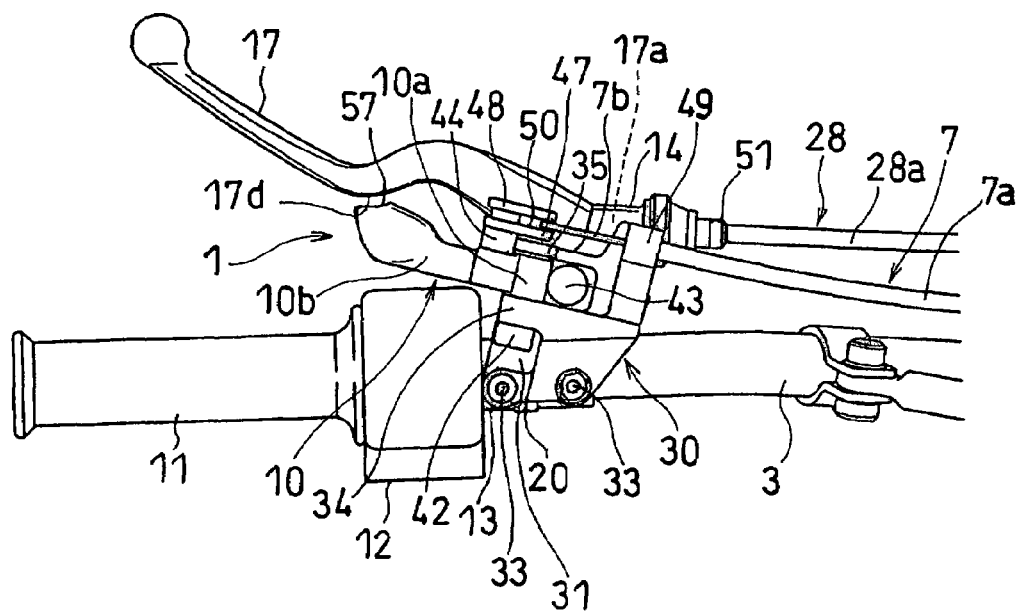
FIG. 11 is a fragmentary plan view of a portion of the motorcycle, showing the parking brake device according to another preferred embodiment of the present invention.

The parking brake device according to another preferred embodiment of the present invention is shown in FIG. 11. This parking brake device shown in FIG. 11 is substantially similar to that shown in and described with reference to FIGS. 1 to 10, but differs therefrom in respect of the particular shape of the operating area 11b of the parking lever 10.

According to this another embodiment, a portion of the operating area 10b of the parking lever 10 confronting the clutch lever 17 when the parking lever 10 is set to the actuated position and, at the same time, the clutch lever 17 is held at the clutch decoupling position, is inwardly depressed or concaved to define an abutment face 57 of a shape following the curvature of a corresponding portion 17d of the clutch lever 17 facing that portion of the operating area 10b. This is particularly advantageous in that the contact pressure between the clutch lever 17 and the parking lever 10 can be minimized because, when the clutch lever 17 is pulled in close towards the grip 11 while the parking lever is still held at the actuated position shown by the solid line, that portion 17d of the clutch lever 17 can be held in surface contact with the abutment face 57 in that portion of the operating area 10b.

Although the present invention has been shown and described as applied to the vehicle of a specific type equipped with the clutch lever 17 mounted on the steering handle 3 with reference to the accompanying drawings which are used only for the purpose of illustration, those skilled in the art will readily conceive numerous changes and modifications within the framework of obviousness upon the reading of the specification herein presented of the present invention. By way of example, the parking lever 10 of the present invention can be employed even in a vehicle equipped with no clutch lever, but with a centrifugal automatic clutch, in a fashion similar to a brake lever, which is another kind of vehicle operating lever and which may be in this case employed in a manner similar to the clutch lever 17 discussed hereinbefore.

Also, the present invention may not be always limited to the four-wheeled buggy such as shown and described and may be equally applied to any other vehicle equipped with a bar-type handle such as, for example, a motorcycle.

Accordingly, such changes and modifications are, unless they depart from the scope of the present invention as delivered from the claims annexed hereto, to be construed as included therein.

What is claimed is:

1. A parking brake device for a vehicle, which comprises:
    a vehicle operating lever pivotally mounted on a bar-type steering handle having one end thereof provided with a grip to be gripped by a driver;
    a parking lever pivotally supported by the steering handle and extending radially relative to the axis of the pivotal axis, and manually movable between an actuated position, at which a parking brake mechanism mounted on the vehicle is actuated, and a release position at which the parking brake mechanism is released; and
    wherein the parking lever has a free end formed with an operating area that, when moved to the actuated position, is positioned in between the grip of the steering handle and the vehicle operating lever to prevent the vehicle operating lever from being pivoted in an operating direction.

2. The parking brake device as claimed in claim 1, wherein the parking lever is pivotable approximately 180° about an axis of pivot thereof from the actuated position towards the release position that is defined forwardly of a handlebar to thereby enable the vehicle operating lever to pivot in the operating direction.

3. The parking brake device as claimed in claim 1, wherein the vehicle operating lever is a clutch lever used to selectively couple and decouple a clutch of the vehicle.

4. The parking brake device as claimed in claim 1, further comprising an operating lever holder for pivotally supporting the vehicle operating lever; a clamp cooperable with the operating lever holder, the operating lever holder being fixedly mounted on the steering handle through the clamp; and a parking lever holder mounted on the clamp for pivotally supporting the parking lever.

5. The parking brake device as claimed in claim 4, further comprising a cable for operatively connecting the parking lever and the parking brake mechanism with each other, the cable having one end provided with an anchoring piece secured thereto, wherein the parking lever has a base end pivotably supported in between first and second lever support members provided in the parking lever holder and wherein the anchoring piece is arranged at a location displaced away from the base end of the parking lever along an axis of pivot of the parking lever.

6. The parking brake device as claimed in claim 5, wherein the first lever support member is positioned on one side of the second lever support member remote from the anchoring piece and has an internally threaded hole defined therein, the second lever support member has an insertion hole defined therein in alignment with the internally threaded hole in the first lever support member and wherein the base end of the parking lever has a throughhole defined therein, and further comprising a support bolt threaded into the internally threaded hole in the first lever support member and then through the throughhole in the base end of the parking lever and finally inserted through the insertion hole in the second lever support member, to thereby pivotally support the parking lever.

7. The parking brake device as claimed in claim 1, wherein a free end of the parking lever remote from an axis of pivot of the parking lever has an abutment face defined therein, which surface-contacts a portion of the vehicle operating lever, confronting the abutment face, at the actuated position when the vehicle operating lever is pivoted.

8. The parking brake device as claimed in claim 7 wherein the free end of the parking lever abutment face is concave and complementary in shape to receive a portion of the vehicle operating lever when preventing the vehicle operation lever from being pivoted to an operating position.

9. A parking brake device for a vehicle, which comprises:
    a vehicle operating lever pivotally mounted on a bar-type steering handle having one end thereof provided with a grip to be gripped by a driver;
    a parking lever manually movable between an actuated position, at which a parking brake mechanism mounted on the vehicle is actuated, and a release position at which the parking brake mechanism is released; and
    wherein the parking lever has a pivotally movable portion that is formed so as to be positioned in between the grip of the steering handle and the vehicle operating lever and the pivotally movable portion is configured to prevent the vehicle operating lever from being pivoted in an operating direction, when the parking brake mechanism is moved to the actuated position.

10. The parking brake device as claimed in claim 9 wherein a free end of the parking lever abutment face is concave and complementary in shape to receive a portion of the vehicle operating lever when preventing the vehicle operation lever from being pivoted in the operating direction.

11. A parking brake device for a vehicle, which comprises:
    a vehicle operating lever mounted on a bar-type steering handle having one end thereof provided with a grip to be gripped by a driver;
    a parking lever manually movable between an actuated position, at which a parking brake mechanism mounted on the vehicle is actuated, and a release position at which the parking brake mechanism is released; and
    wherein the parking lever has a pivotally movable portion that rotates to a position between the grip of the steering handle and the vehicle operating lever, an abutment face of the pivotally movable portion opposite the vehicle operating lever, when placed in the actuated position, is configured to blockingly engage and hold the vehicle operating lever from being moved to an operating position adjacent the grip of the steering handle.

12. The parking brake device as claimed in claim 11 wherein the parking lever abutment face is concave and complementary in shape to receive a portion of the vehicle operating lever when preventing the vehicle operation lever from being pivoted to the operating position.

* * * * *